Sept. 29, 1964  J. C. SMITH ETAL  3,151,065
AUTOMATIC FILTRATION SYSTEM
Filed April 25, 1961  6 Sheets-Sheet 1
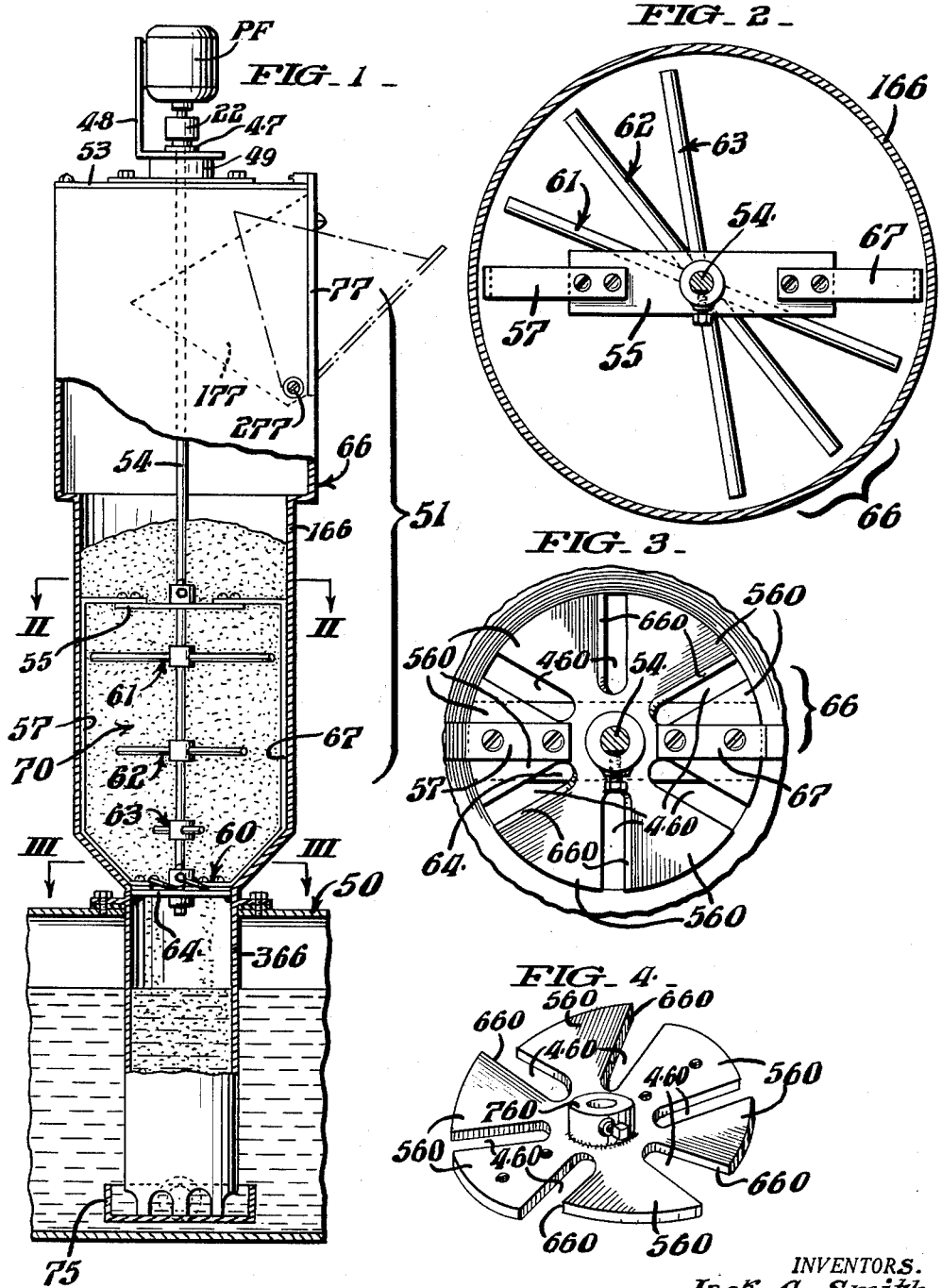
INVENTORS.
Jack C. Smith,
Edwin E. Etterman &
Roy T. Romine,
BY Paul & Paul
ATTORNEYS.

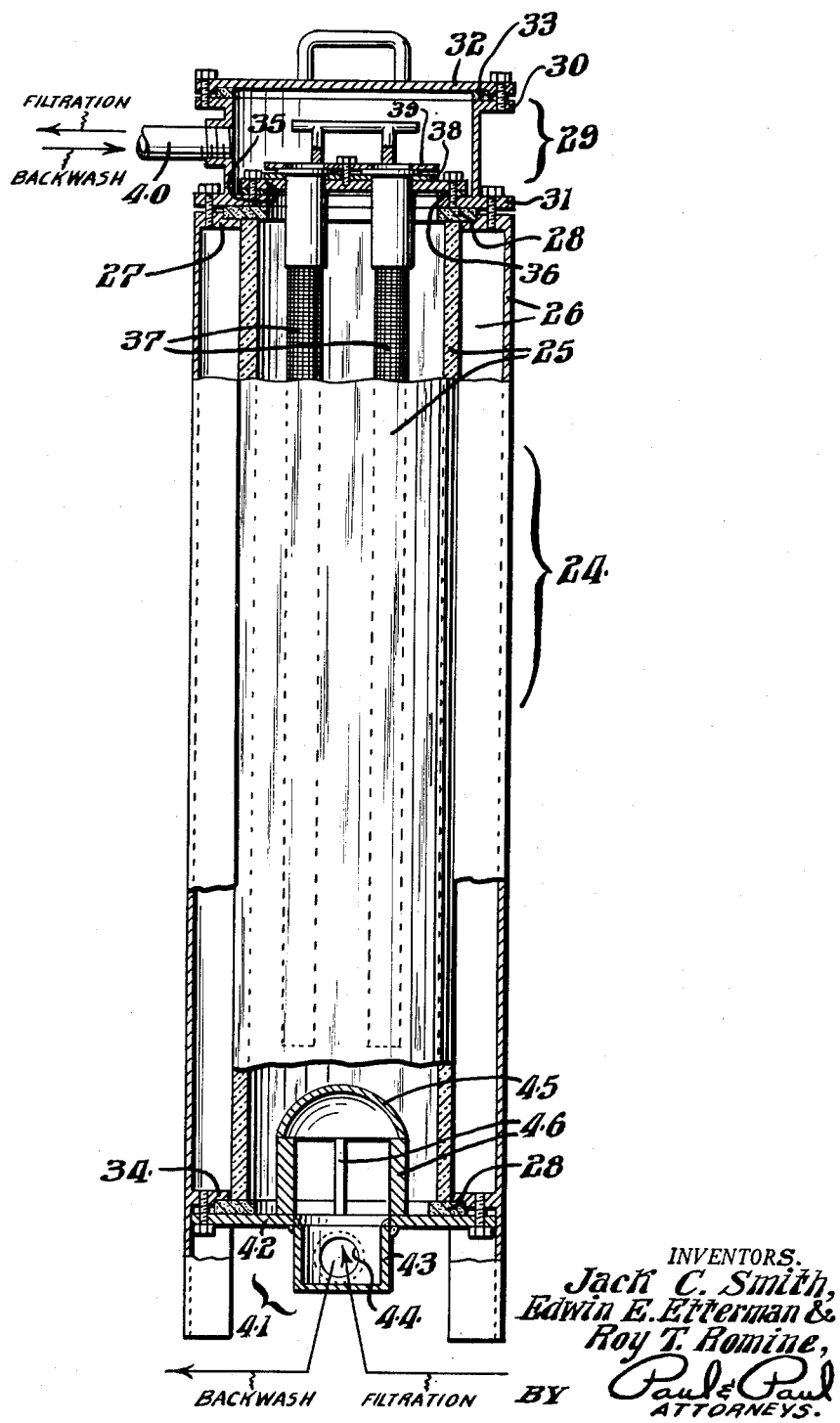

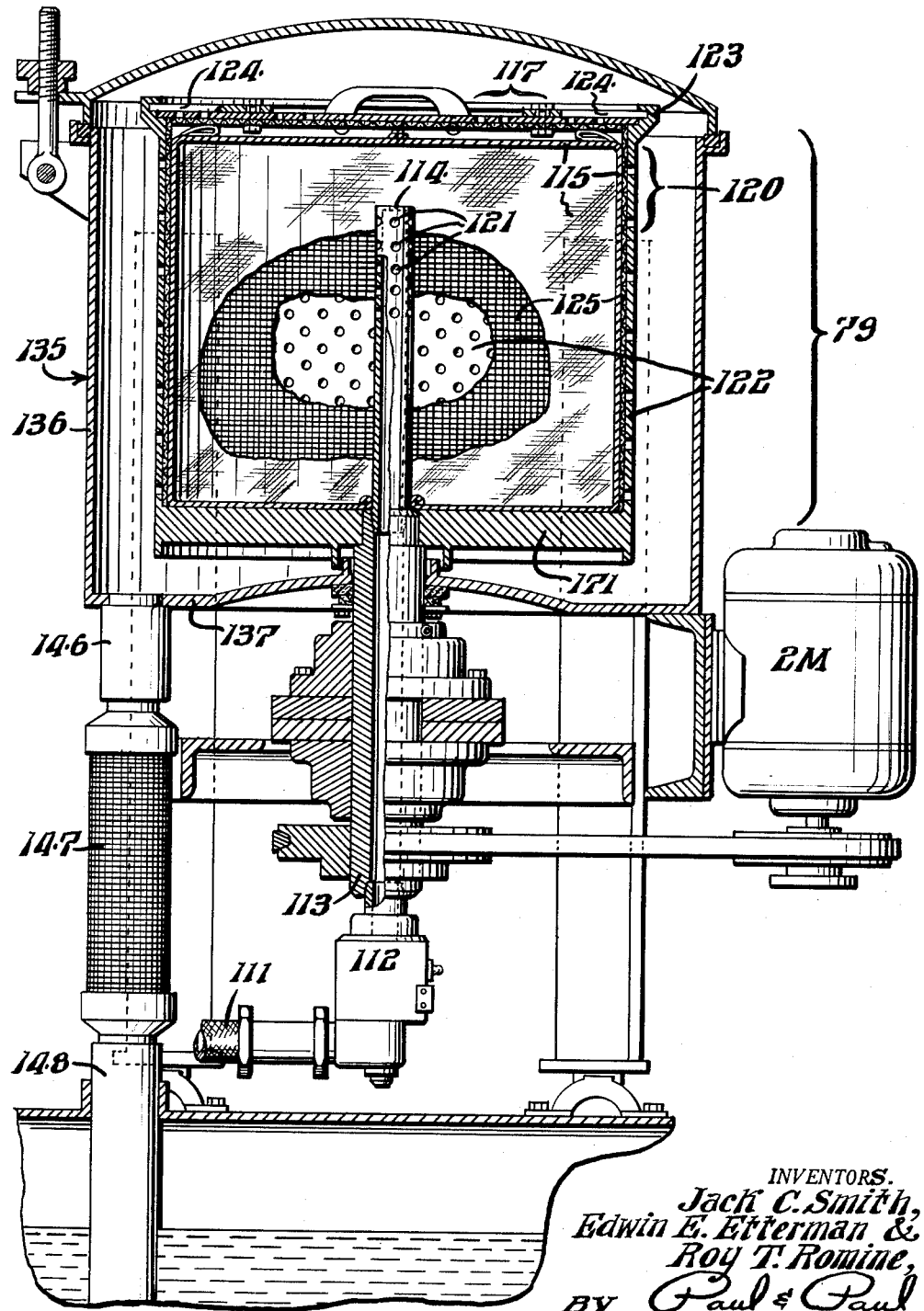

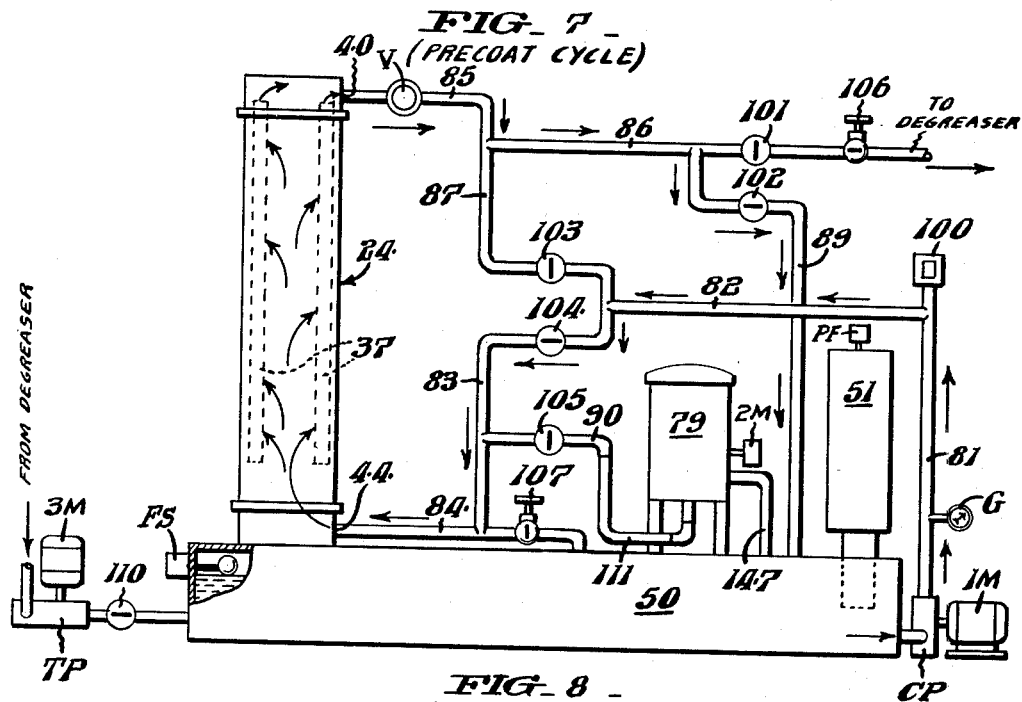
FIG. 7 (PRECOAT CYCLE)
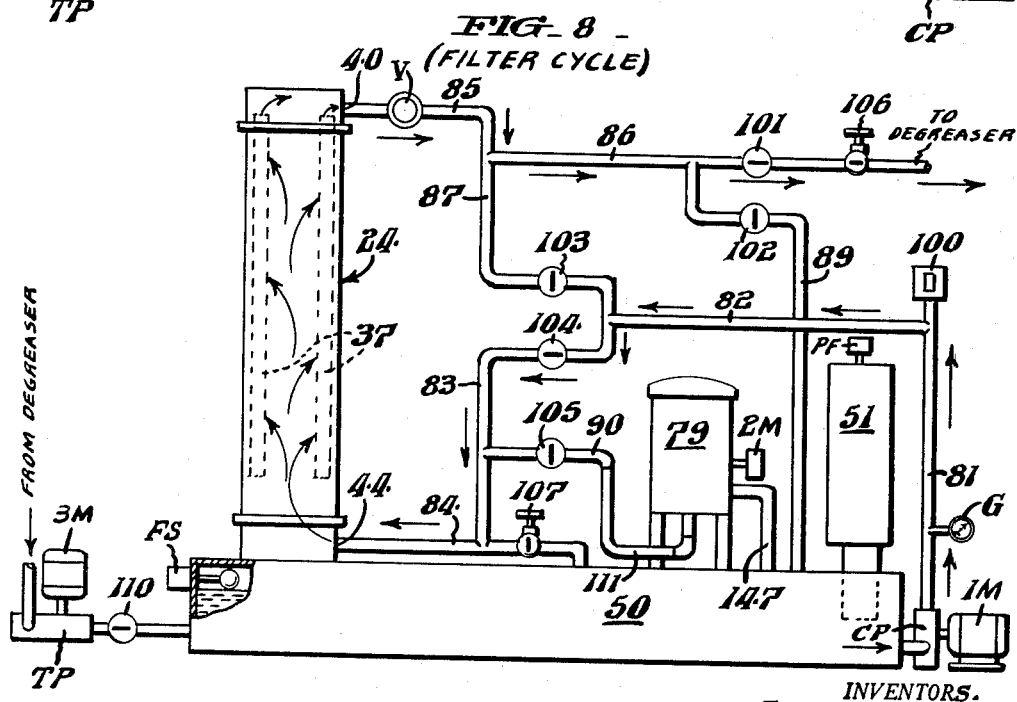
FIG. 8 (FILTER CYCLE)
INVENTORS.
Jack C. Smith,
Edwin E. Etterman &
Roy T. Romine,
BY Paul & Paul
ATTORNEYS.

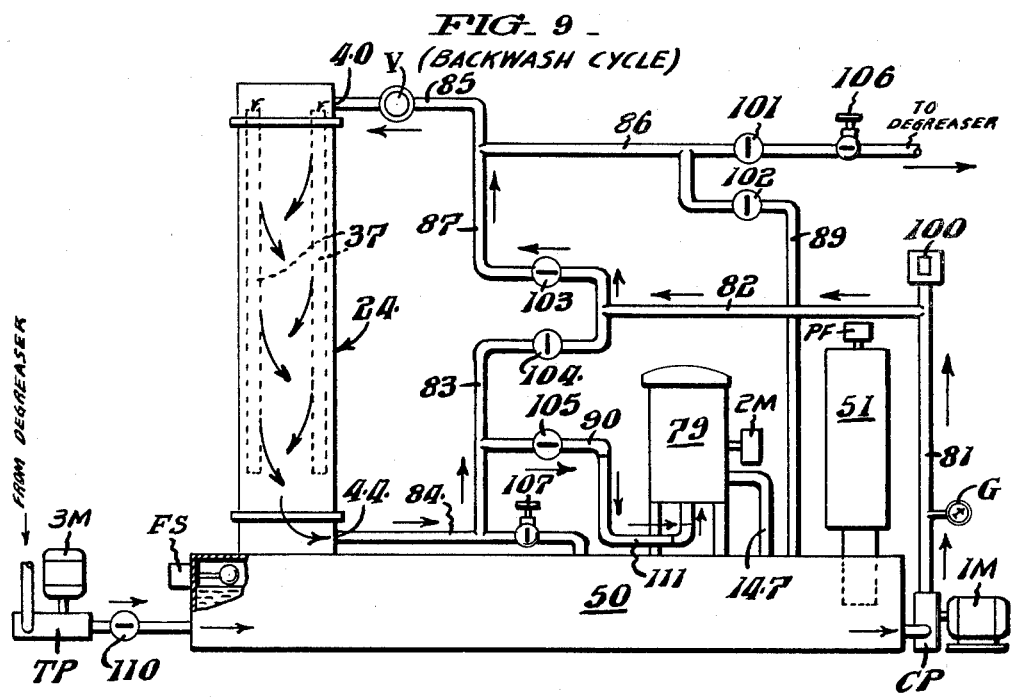

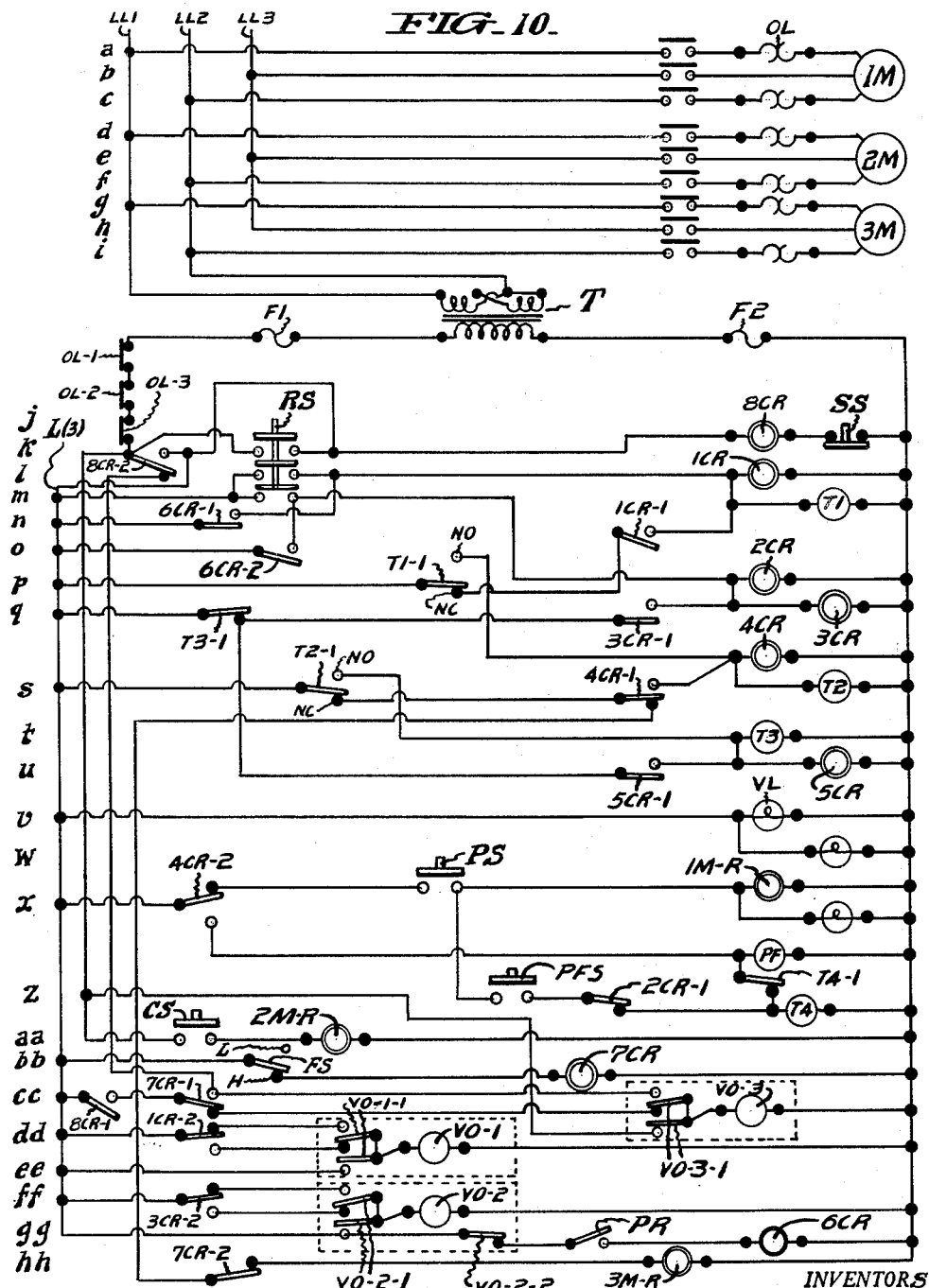

United States Patent Office 3,151,065
Patented Sept. 29, 1964

3,151,065
AUTOMATIC FILTRATION SYSTEM
Jack C. Smith, Edwin E. Etterman, and Roy T. Romine, all of Bowling Green, Ky., assignors to Detrex Chemical Industries, Inc., Detroit, Mich., a corporation of Michigan
Filed Apr. 25, 1961, Ser. No. 105,379
3 Claims. (Cl. 210—108)

This invention relates to an automatic filtration apparatus or system adapted for the filtration or clarification of a wide range of industrial liquids, including non-aqueous liquids, aqueous liquids, emulsions of the so-called soluble oils, and others. Such liquids may be used for cleaning, lubricating, heating, cooling, power transfer (hydraulic liquids), chemical processing (crystallization, drying, solution, and other treatments), and other purposes.

It will facilitate describing and understanding the new filtration system to describe one specific embodiment of its use, namely, its use in conjunction with a solvent vapor degreaser. However, use of the new system is much broader, as has already been indicated above.

When used with a vapor solvent degreaser, the solvent to be cleaned will ordinarily be a chlorinated hydrocarbon solution, such as perchlorethylene. The new apparatus is adapted to continually remove solid soil from the solvent (or other liquid) and to return clear solvent to the degreaser chambers (or other apparatus). In the case of a vapor degreaser, we have found that the use of our new filtration machine increases by as much as five to ten times the length of the period that the degreaser may be operated before costly clean-out thereof is required.

The new automatic filtration apparatus or system includes a pump, a main filter, an automatic filter powder dispenser, a secondary filter; pressure sensing means for ascertaining when the filter elements have become contaminated, and electric circuit means including relays and other components for controlling automatically the operation of fluid flow valves, the starting and stopping of motors, and other actions, thereby, among other things, to backwash the filter system when a pre-determined pressure level has been reached and to precoat automatically the filter elements for the next cleaning cycle.

The pressure sensing means is set so that a selected increase in flow pressure will operate the pressure switch and initiate the backwash cycle, thereby cleaning the filter before the flow rate is undesirably reduced.

The automatic filter powder dispenser is adapted to feed filter powder in uniform correct amounts to the solvent supply without any need of manual measurement.

The secondary filter functions as a container for the muck and is effective to separate the muck from the solvent and to return the solvent to the system without the use of steam or water. The secondary filter also functions, when desired, as a centrifuge extractor, separating the solvent from the muck contained therein and allowing the solvent to return to the system. The main filter may be backwashed between twenty and twenty-five times before it is necessary to spin the centrifuge extractor to extract solvent from the muck collected therein. The bag containing the almost dry soil and spent filter powder may then be emptied or disposed of.

The new automatic filtration system of the present invention will be best understood from a consideration of the following detailed description of a preferred embodiment illustrated in the drawing, in which:

FIG. 1 is a side elevational view, partly in section, showing a preferred form of automatic filter powder dispenser used in the filtration system of the present invention;

FIG. 2 is a sectional view along the line II—II of FIG. 1 looking in the direction of the arrows;

FIG. 3 is a sectional view along the line III—III looking in the direction of the arrows;

FIG. 4 is a perspective view of the agitator or cutting plate;

FIG. 5 is an elevational view, partly in section, showing one form of main filter which may preferably be used;

FIG. 6 is an elevational view, partly in section, showing the secondary filter or centrifuge extractor in a preferred form;

FIG. 7 is a diagrammatic representation of the automatic filtering system of the present invention, with arrows showing the flow paths during the precoat cycle;

FIG. 8 is a diagrammatic representation similar to that of FIG. 7, with arrows showing the flow paths during the filtration cycle;

FIG. 9 is a diagrammatic representation similar to that of FIGS. 7 and 8, with arrows showing the flow paths during the backwash cycle; and FIG. 10 is a circuit diagram of the electric and control circuits.

Referring now to FIG. 5 the main filter 24 is shown to comprise a glass cylinder 25 enclosed within the steel frame 26 with steel plates 27, 34 at the top and bottom, respectively, bored to receive the glass cylinder 25 and machined to retain gaskets 28 at each end of the glass. Mounted at the top is a cylinder assembly 29 of steel having flanges 30 and 31 welded at either end. The top flange 30 has a plurality of tapped holes to receive screws to retain a cover 32 which is machined to retain a gasket 33 for effecting a seal between cover 32 and cylinder assembly 29. The bottom flange 31 of top cylinder assembly 29 has a plurality of tapped holes to receive screws which retain a filter septum plate 35, compressing a gasket 36 between the filter septum plate 35 and bottom flange 31. The filter septum plate 35 is bored to receive a plurality of tubular screen elements 37 which function as filter septum elements. These elements have a flanged cylindrical ferrule at their top. Gasket 38 has holes to match those in filter septum plate 35 and is placed over the plate 35 after which the filter septum elements 37 are inserted so that their flanges abut gasket 38. Retainer plate 39 having like holes is placed over the gasket 38 and pulled down with a plurality of screws to compress the gasket 38 and form a seal between the flanges of the filter septum elements 37, the retainer plate 39 and filter septum plate 35. Bottom flange 31 has a plurality of clearance holes through which screws are screwed into the top plate 27 of frame 26. Bottom flange 31 presents serrated surfaces to gaskets 28 and 36 to effect a better seal. The cylinder assembly 29 is provided with screwed conduit connection 40 which functions as the filter outlet in the normal filter cycle and as the filter inlet during the backwash cycle.

The bottom assembly 41 comprises a plate 42 to which is affixed a cylinder 43 provided with a screwed conduit section 44 which functions as the solvent inlet during normal filter cycles and as the filter outlet during backwash. Affixed to bottom plate 42 on the opposite side of the solvent inlet 44 is a baffle 45 supported on bars 46 leaving openings between baffle 45 and bottom plate 42 several times as large as the area of the conduit opening 44. Baffle 45 is provided to diffuse the solvent flow and minimize turbulence around the tubes so that the powder introduced coats the tubes evenly. Plate 42 has a plurality of clearance holes through which screws are fastened into the bottom plate 34 of frame 26. Plate 42 presents a serrated surface to gasket 28 to effect a better seal.

When top cylinder assembly 29 and bottom assembly 41 are pulled up with the attaching screws, the glass cylinder 25 is effectively sealed against gasket 28.

In the precoat and filtration cycles, solvent enters the glass cylinder 25 through the bottom conduit inlet 44, passes through the tubular filter septum elements 37 to the interior thereof, then upwards through the tubes into cylinder assembly 29 and out the conduit outlet 40. From there, the solvent is directed either to the tank 50 or to the degreaser depending upon whether the machine is in the precoat or filtration cycles, as illustrated diagrammatically in FIGS. 7 and 8, respectively, later to be described. In the precoat cycle, filter powder is introduced with the solvent entering the cylinder 25 and coats the tubular screen or filter septum elements 37 to present the filtering medium. It is important that a filter powder cake be established on the filter septum 37 prior to the introduction of soil, as otherwise any soil reaching the filter septum 37 would clog its openings. Additional powder may be added during the filtration cycle along with the soil to keep the filter cake porous, as is hereinafter described.

In the backwash cycle, as illustrated diagrammatically in FIG. 9, the solvent flow through filter 24 is reversed. Solvent now enters the filter 24 at the top through conduit connection 40, passes downward through the inside of the tubular filter septum elements 37, and leaves the filter through the bottom conduit connection 44. From there, it is directed to the secondary filter or sub-filter muck stripper 79, which may preferably be of the centrifugal extraction type.

The filter 24 preferably, but not necessarily, incorporates a glass cylinder 25. The glass cylinder has the advantage of exposing the condition of the interior and of the filter septum elements to observation at all desired times. If, at any time, clogging, lack of filter powder, bridging, or any other filter failures are observed, immediate steps may be taken to correct the condition.

In the automatic filtration system which is the subject matter of the present application, the filter 24 may have a relatively small capacity, sufficient only to remove soil from a relatively small amount of work, since the automatic machine is adapted to clean the filter and recoat the filter septum at frequent intervals.

The automatic filtration system incorporates an automatic filter powder dispenser 51 which holds a supply of filter powder sufficient for about 20 to 25 precoat and filtration cycles. It uses a rotational feed mechanism which feeds uniform and controlled amounts of filter powder to the solvent for each rotation of the feed mechanism, thereby eliminating the necessity of constant attention by the operator.

Referring now to FIG. 1, the automatic filter powder dispenser is shown to comprise a vertically disposed housing 66 of generally cylindrical configuration comprising an upper section 166 and a lower section 366 of smaller diameter than the upper section. Housing 66 is mounted, as by bolts or other suitable means, in vertical position on the solvent storage tank 50 of the automatic filtration system. The lower portion of lower section 366 extends downwardly into the tank 50 and terminates in a sump 75.

A drive shaft 54 is supported by an upper bearing 47 and a lower bearing 64 in vertical position on the center axis of upper section 166 of housing 66. Drive shaft 54 is adapted to be driven rotationally as by a motor PF through a suitable coupling 22 which may be either rigid or flexible. The motor assembly comprising motor PF, coupling 22, bearing 47, bracket 48 and support plate 49 are mounted on cover plate 53 of housing 66. By means of slotted holes in plates 49 and 53, the motor assembly is adjustable in any direction to a limited extent so that drive shaft 54 may be properly oriented with respect to the axis of housing 66.

Provided in the upper portion of upper section 166 is an access door 77 which opens outward about pivot point 277 to an angle of about 45°, and which has side panels 177 so as to serve as a chute for delivering diatomaceous earth filter powder to the housing 66.

Secured to the lower end of drive shaft 54 just above the lower bearing 64 is a generally disc-like agitator or cutting plate 60, the form of which is shown in perspective in FIG. 4.

As seen in FIG. 4, agitator or cutting plate 60 is provided with a plurality of radially disposed notches or slots 460 of substantial depth and width, forming between the slots a plurality of sectors 560. One corresponding edge 660 of each sector is bent upwardly so that when the plate 60 is driven rotationally in a clockwise direction, the raised edges 660 form cutting blades or at least agitating blades.

Secured to the hub of plate 60, as by welding, is a cylindrical collar 760 having therein a set screw adapted to be pressed against a flat surface provided at the lower end of drive shaft 54, thereby to secure plate 60 firmly but axially adjustable on shaft 64.

Secured to agitator or cutting plate 60, as by screws, are a pair of opposed paddle arms 57 and 67. As seen in FIG. 1, paddle arms 57 and 67 are shaped to extend radially outward from the plate 60 and then diagonally upward along the wall of the frusto-conical portion of section 166 of the housing, and then vertically upward along the wall of the housing. The upper extremities of paddle arms 57 and 67 then turn inwardly and are secured to a plate 55, as by screws. Plate 55 includes a collar, which may be secured thereto as by welding, having therein a set screw which bears against a flat portion of shaft 54. Thus, plate 55 is adjustable axially on shaft 54, and together with the axially adjustable agitator or cutting plate 60 provides clearance adjustment between the paddle arms 57, 67 and the wall of the frusto-conical portion of housing 66.

Secured to drive shaft 54, at spaced-apart locations between plate 55 and agitator or cutting plate 60, are hub assemblies 61, 62 and 63, each of which comprises a collar fixed to shaft 54, and hence rotatable therewith, and a pair of opposed radially protruding arms. As best seen in FIG. 2, each pair of opposed arms of hub assemblies 61, 62 and 63 occupy a different diametrical plane of housing 66. The diametrical planes occupied by the pairs of opposed radial arms of the hub assemblies, may also preferably be different from the diametrical plane occupied by the opposed paddle arms, 57 and 67.

In operation, the upper section 166 of the housing above the agitator or cutting plate 60 is filled with diatomaceous earth filter powder through the open door 77 serving as a fill chute. The amount of filter powder held by the housing is sufficient to supply powder for about 20 to 25 precoat and filtration cycles.

When the system calls for powder, the powder feeder motor PF is energized and the drive shaft 54 is driven rotationally through the coupling 22. As previously indicated, the drive shaft 54 is driven rotationally in such direction that the raised edges 660 of the sectors 560 of the agitator or cutting plate 60 become the leading edges. Thus, in the particular embodiment shown, the agitator plate 60 is driven by shaft 54 in a clockwise direction, as viewed from above.

When drive shaft 54 and agitator or cutting plate 60 are driven rotationally, paddle arms 57 and 67 and hub assemblies 61, 62 and 63 are also driven rotationally, since the paddle arms and hub assemblies are secured to drive shaft 54.

The rotation of all these parts, i.e., the agitator or cutting plate 60, the paddle arms 57, 67, and the opposed hub assemblies 61, 62 and 63 (all of which for convenience will be sometimes referred to herein as the rotatable feed parts) causes filter powder to feed through slots 460 of plate 60 and to drop into the solvent in the lower section 366. The feeding of powder through the slots 460 is due to the difference in the rotational speeds of the mass 70 of filter powder and that of the rotatable feed parts, above-identified.

Before the rotatable feed parts are first rotated, after having been stopped, the mass 70 of filter powder in housing 66 is in column form, each particle tending to cling to adjoining particles and also to the wall of housing 66. It will be understood that, except for the narrow vertical strips of wall space occupied by the arms 57 and 67, the powder in the housing 66 is in contact with the wall of the housing. As a result, the column of powder resists rotation. While such resistance is due primarily to the substantial amount of powder in contact with the wall of the housing 66, it also is due to the inherent resistance to motion of a body at rest. In any event, when the motor PF is energized and the drive shaft 54 starts to rotate, the rotational movement of the mass 70 of filter powder lags behind that of the rotatable feed parts (comprising the agitator or cutting plates 60, the paddle arms 57, 67 and the hub assemblies 61, 62 and 63). As a consequence, the raised leading edges 660 of the agitator or cutting plate 60 tend to shear off, or at least agitate, the filter powder which is in contact with or immediately above the plate 60. In addition, the pairs of opposed arms of the hub assemblies 61, 62 and 63 move through the mass 70 of the filter powder in three spaced-apart horizontal planes. The effect is to breakup the column of powder and to prevent packing, and thereby to maintain the powder in a uniform broken-up condition within the lower section 166 of housing 66.

After drive shaft 54 and paddle arm 57, 67 have completed one half of a revolution, continued rotation of the paddle arms close to the surface of the wall of housing 166 prevents the powder from adhering to the wall but the rotational movement of the mass of powder never attains the speed of rotation of the rotatable feed parts. Thus, the raised edges 660 of agitator plate 60, and also the hub assemblies 61, 62, and 63, continue to move relative to the powder and in so doing prevent packing thereof. This has the effect of maintaining uniform contact pressure of the powder on the plate 60.

Stated another way, the rotation of paddle arms 57 and 67 combined with the rotation of the hub assemblies 61, 62 and 63 prevents the filter powder from bridging from wall to wall across the housing 166 and prevents packing, thus assuring a substantially uniform supply of loose filter powder in contact with plate 60. Agitator or cutting plate 60, together with the hub assemblies 61, 62, and 63, prevent the powder from rotating as a mass or unit column within the housing.

By agitating and breaking up the mass of powder, the rotating feed parts prevent packing and cause a substantially uniform contact pressure of filter powder on plate 60. The total result is to feed a uniform supply of powder to the solvent in the tank 50 for a given rotational speed of the drive shaft 54. After passing through the slots 460 in plate 60, the powder falls into the solvent in tank 50 where it forms a slurry which is sucked by the circulating pump CP up through the conduit of the automatic filtration system.

It will be seen from the foregoing description that the filter powder dispenser is adapted to feed a uniform quantity of filter powder to the liquid solvent for each rotation of the agitator plate 60. To increase the quantity of powder dispensed per revolution of agitator plate 60, the leading edges 660 of the sectors 560 may be bent upwards to an increased extent, thereby to increase the amount of powder which is sheared off or agitated for each revolution.

Since the filter 24 is of relatively small area, in view of the relatively frequent backwashings contemplated by the automatic filtration system of the present invention, a secondary filtration and storage container is provided for the combination of solvent, filter powder, and solid soil, commonly referred to as muck. Such a secondary filtration and storage container is shown in detail in FIG. 6.

When the filter 24 is to be backwashed, the direction of the solvent flow therethrough is reversed, thus washing the accumulated cake from the septum elements 37 of filter 24. The removed cake then forms a slurry with the solvent. This muck slurry, comprising solvent, filter powder, and solid soils, moves under pump pressure from circulating pump CP out through the lower opening 44 of filter 24, through the conduit 90 (FIG. 9), through the flexible hose 111 (FIG. 6), through the rotary union 112, which is fastened to the shaft 113 of the basket 120, up the interior of the hollow shaft 113, and out through the holes 121 in ejector pipe 114 which is located inside the subfilter membrane or bag 115. The bag 115 becomes quickly filled with the muck slurry and expands out against the basket 120 and the cover 117. The basket 120 is mounted rigidly to the shaft 113 at the bottom plate 171. Attached securely to the bottom plate 171 is a perforated shell 122 forming the walls of the basket 120. The perforations allow the solvent to escape from the basket 120. Affixed to the top edge of the shell 122 is a ring 123 which provides a seat for the perforated cover 117 and the cover latching arms 124. A basket liner 125 is provided of woven wire cloth to prevent the bag 115 from being forced into the perforations of the shell 122 by centrifugal force during the extraction cycle, which otherwise would subject the bag 115 to localized strain and make it difficult to move the bag from the basket 120. The basket liner 125 also provides interconnecting channels or passages for the solvent between the perforations of the shell, thus decreasing the restriction to the flow of the solvent through the bag 115 and from the basket 120.

The filter bag 115 is preferably made of nylon cloth but could be made of any material capable of retaining the muck solids and passing the solvent. The bag 115 has one end closed by means of a zipper or other suitable fastening device so that the solids may be removed from the bag after extraction. The bag is then cleaned by some suitable method, such as dry cleaning, thus preparing it for reuse. In the case of a disposable one-operation bag, the zipper or closure means can be dispensed with.

In operation, muck slurry, under pump pressure from circulating pump CP, moves from filter 24 through the conduit 80, through the flexible hose 111, the rotary union 112, up the hollow shaft 113 and out through the holes 121 in the injector pipe 114. The bag 115 quickly fills with muck slurry and expands out against the basket 120 and cover 117. The basket 120 may be assumed to be not rotating. The solvent leaves the basket through the bag and the perforations in the basket, leaving muck solids inside the bag. The discharge of the muck slurry under pump pressure through the perforations in the ejector 114 agitates the slurry to help even the disposition of the slurry solids on the surface of the wall of the bag.

After a controlled time period of sufficient length to assure that all of the muck slurry has been discharged from the filter 24 (1½ minutes in a typical case), the control system automatically shuts off the circulating pump CP, and actuates valve operators which perform the necessary valve changes to return the system to the filter cycle. When the drain line valve 105 (FIGS. 7, 8 and 9) is closed, the source of continuing pressure is removed from the muck slurry. Hence, the pressure in the extractor decreases to atmospheric pressure, as the solvent passes through the bag. When this condition is reached, the free solvent slowly drips from the bag, due to gravity and the desire of a liquid to seek its own level.

The solvent escaping from the bag 120 must be confined and collected for return to the storage tank 50 of the automatic filtration machine. To accomplish this solvent collection, the basket assembly is mounted on a frame assembly. In FIG. 6, the frame assembly shown consists of a cylinder 135 with a solid shell 136 suitably fastened to the bottom 137 to give a liquid-tight seam.

The bottom 137 has two holes, one centrally located through which the basket shaft 113 passes. The second hole is located near the outer edge and forms an exit for the collected solvent. Affixed to the underside of the cylinder bottom 137 and surrounding said hole is a fitting 146 which serves as a coupling for the drain line 147 which terminates at a fitting 148 on the storage tank 50. It is preferable that the fitting 148 extend below the liquid level in the storage tank 50 to restrict any fan effort on the part of the basket 120 during the centrifugal extraction cycle.

The structure of each of the three principal components of the automatic filtration system, namely, the main filter (FIG. 5), the filter powder dispenser (FIGS. 1–4) and the secondary filter and centrifuge extractor (FIG. 6), has been described in some detail. Reference is now made to FIGS. 7, 8 and 9 which illustrate diagrammatically the complete automatic filtration system. Shown diagrammatically in these figures are the following: main filter 24; the filter powder dispenser identified by reference numeral 51 and shown to be driven by powder feeder motor PF; the secondary filter and centrifugal extractor identified by reference numeral 79 and shown to be driven by motor 2M; the circulating pump CP driven by the motor 1M; the transfer pump TP driven by the motor 3M; the pressurestat or pressure sensitive switch 100; and motor controlled valves 101 through 105 indicated as being either open or closed according to the position of the gate (represented by the bar within the circle). Valves 106 and 107 are manually operable valves, valve 106 being open and valve 107 being closed in each of the figures. Also shown is a float switch FS which controls the operation of the valve 110 connected in the line between the transfer pump TP and the tank or reservoir 50. In FIGS. 7, 8 and 9, arrows indicate the flow paths, which are different for each of the cycles.

Referring first to FIG. 7 which shows the precoat cycle, it will be seen that valves 101, 103, 105 are closed while valves 102 and 104 are open. Under pressure from the circulating pump CP, solvent flows from the reservoir 50 up the piping 81, across piping 82, through the open valve 104, down piping 83, across piping 84, into the main filter 24, through the tubular filter septum elements 37, up through the interior of tubular elements 37, out the top of filter 24, across piping 85 and 86, down through open valve 102 and piping 89 back to reservoir 50. During the entire precoat cycle (which is under the control of a timer T2 later to be referred to) the powder is being fed in controlled amounts by the rotating feed mechanism previously described into the reservoir 50. This powder is carried by the solvent through the piping to the filter 24 and is deposited on the mesh of the filter septum elements 37 forming a coat thereon.

At the termination of the precoat cycle, as determined by the timer T2, the conditions of valves 101–102 are changed by a filter sweep valve operator VO–2 (later to be described) and take the open or closed positions indicated diagrammatically in FIG. 8. As there seen, valve 101 is now open while valve 102 is now closed. The valves, 103, 104 and 105, remain in the same conditions they were in during the precoat cycle. Soil laden solvent from the degreaser or other work machine, now passes through the transfer pump TP, through the open valve 110 and into the reservoir or tank 50, through the "on" centrifugal pump CP, up piping 81, over piping 82, down piping 83, over piping 84, through the tubular filter septum elements 37 and up through the interior of the tubes, out through piping 85 and 86, through open valves 101 and 106, and back to the degreaser or other work machine.

If, during the filter cycle, the pressure sensed by the pressurestat 100 exceeds the value set on the switch, the pressure switch 100 is actuated and the system is converted to the backwash cycle. This cycle is shown diagrammatically in FIG. 9. The valve 101 remains closed but valve 102 is now also closed by valve operator VO–2. Valves 103, 104 and 105 are changed by valve operator VO–1 so that valve 103 is now open, valve 104 is now closed, and valve 105 is now open. Solvent is driven under pressure by the circulating pump CP up the piping 81, across the piping 82, through the open valve 103, up piping 87, over piping 85, into the top of the filter 24, down through the inside of the tubular filter septum elements 37 and out through the mesh forcing the cake of filter powder and soil to drop off and fall to the bottom of the filter where it forms a slurry and is carried out through piping 84, up the lower portion of piping 83, out through the open valve 105, through the piping 90 and into the secondary filter 79. As previously described in connection with FIG. 6, filter 79 functions to catch the soil and filter powder, thereby separating the muck from the solvent. The solvent drips through the filter bag and is returned to the reservoir 50. It may be assumed that during the backwash cycle the basket of the secondary filter 79 is not being rotationally driven. At the conclusion of from say twenty to twenty-five backwashings, the bag of the secondary filter may have sufficient muck accumulated therein to require emptying. Before emptying, the motor 2M of secondary filter 79 is energized and the basket is rotated to centrifuge the solvent from the muck.

*Operation*

The operation of the automatic filtering system will now be described with particular reference to the circuit diagram shown in FIG. 10. For convenience to the reader, the branch or approximate branch in which the component is located is sometimes indicated in parenthesis.

In FIG. 10, the switches are shown in the positions which they occupy when the machine is at rest, and all relays are deenergized. The backwash valve operator VO–1 (branch *dd*) and the filter sweep valve operator VO–2 (branch *ff*) are both in the filter position, i.e., in the positions which they occupy during the filtration cycle. The transfer valve operator VO–3 (branch *cc*) is in the closed position, i.e., in the position occupied when the transfer valve 110 (FIGS. 7, 8, 9) is closed.

*Backwash*

Assume that the operator desires to initiate the backwash cycle. He does this by pushing the spring-biased restart-backwash switch RS (branch *m*). When this is done, momentary contact is made at its three sets of contacts and a number of things happen, as follows:

Through the top contacts of the restart-backwash switch RS and the normally-closed contacts of the stop switch SS (branch *k*), the relay 8CR (branch *k*) is energized. The relay contacts 8CR–2 (branch *k*) and 8CR–1 (branch *cc*) move to their energized positions. This supplies power to line L(3) and locks in relay 8CR. The transfer pump relay 3M–R (branch *hh*) is energized through contacts T2–1 and contacts 4CR–1 (both in branch *s*) and contacts 7CR–2 (branch *hh*) and the transfer pump motor 3M (branch *g*) turns on.

When contacts 8CR–1 and 8CR–2 move to their energized positions, the transfer valve operator VO–3 (branch *cc*) is energized and moves the valve 110 (FIG. 9) to open position.

The timer T1 and the relay 1CR (branch *m*) are energized when the restart-backwash switch RS is momentarily closed. Contacts 1CR–1 (branch *p*) move to energized position and relay 1CR locks up. This locks in timer T1. Contacts 1CR–2 (branch *dd*) move to energized position and the backwash valve operator VO–1 (branch *dd*) is energized and moves the valves 103, 104 and 105 to the backwash positions shown in FIG. 9. Also the contacts VO–1–1 move to the upper positions.

When the restart-backwash switch RS is pushed, the relays 2CR and 3CR (branch *m*) are energized. The contacts 3CR–1 (branch *q*) move to the energized position and the relays 2CR and 3CR lock up. Contacts 3CR–2 (branch ff) move to energized position and filter sweep valve operator VO–2 is energized and moves valves 101 and 102 to the positions shown in FIG. 9. The auxiliary switch VO–2—2 on the filter sweep valve operator VO–2 opens and contacts VO–2–1 move to the upper position.

This completes the description of what happens when the restart-backwash button RS is pushed by the operator.

The operator next closes the pump switch PS (branch x). This energizes the circrulating pump relay 1M–R and starts the circulating pump motor 1M (branch a). The system then performs the backwash operation previously described in connection with FIG. 9. The duration of the backwash cycle is controlled by the timer T1 (branch p).

*Precoat Cycle*

When the timer T1 times out, the contacts T1–1 (branch p) move momentarily to the NO position. Momentary opening of the contacts T1–1 from the NC position deenergizes the 1RC relay and the contacts 1CR–1 open, thus deenergizing the timer T1. The contacts 1CR–2 (branch dd) move to the deenergized position and the backwash valve operator VO–1 is energized and moves valves 103, 104 and 105 to the positions shown in FIG. 7. Contacts VO–1–1 of the valve operator VO–1 move to the positions shown in FIG. 10.

When the contacts T1–1 moved momentarily to the NO position, the relay 4CR and the timer T2 became energized. The contacts 4CR–1 (branch s) move to the energized position and relay 4CR locks up. This deenergizes the transfer pump 3M by opening the circuit to relay 3M–R (branch hh). Also, the contacts 4CR–2 (branch x) move to energized position, thereby deenergizing the pump relay 1M–R and thus shutting down the circulating pump 1M. Moving of contacts 4CR–2 to the energized position energizes the powder feeder motor PF, and filter powder is fed by the filter powder dispenser 51 in the manner previously described. The duration of the precoat cycle is under the control of timer T2.

*Clear-Up*

When the timer T–2 (branch p) times out, contacts T2–1 (branch s) move momentarily to the NO position. This opens the circuit to and effects deenergizing of relay 4CR and timer T2. Momentary closing of the T2–1 contacts at the NO position energizes timer T3 and relay 5CR. Contacts 5CR–1 then close and lock in the relay 5CR. When the contacts T2–1, after momentary contact at the NO position, move back to the NC position, the transfer pump relay 3M–R (branch hh) is energized since contacts 4CR–1 are now in the deenergized position. This turns on the transfer pump motor 3M. Contacts 4CR–2 (branch x) return to their deenergized position, thus deenergizing the motor relay 1M–R of the circulating pump motor 1M, and thus shutting off the circulating pump CP (FIG. 7). Movement of contacts 4CR–2 to the deenergized position also deenergizes the powder feeder motor PF. The system is now ready for the filter cycle.

*Filtration*

When the timer T3 (branch s) times out, the contacts T3–1 (branch q) momentarily open and the relays 2CR, 3CR and 5CR are deenergized. Timer T3 is also deenergized. When the relay 3CR is deenergized, the contacts 3CR–2 (branch ff) move to the deenergized position and the filter sweep valve operator VO–2 is energized and moves back to the filter position shown in FIG. 10. When this happens, the auxiliary switch VO–2–2 on the filter sweep valve operator moves back to the closed position. When the valve operator VO–2 moves back to the filter position, it moves valves 101 and 102 to the positions shown in FIG. 8.

*Body Feed*

If addition of filter powder is desired during the filtration cycle, the operator closes the powder feed switch PFS (branch x). When this is done, the body feed timer T4 is energized through the contacts 4CR–2, the closed pump switch PS, the closed powder feed switch PFS, and the contacts 2CR–1. The powder feed motor PF is also energized. However, body feed timer T4 is a cam timer which, as its cam rotates, opens and closes contacts T4–1, thereby breaking and closing the circuit to the powder feeder motor PF. Thus, filter powder is fed intermittently to the solvent under the control of the body feed timer T4. Such intermittent feeding of filter powder may be terminated at any time by manually opening the powder feed switch PFS (branch x).

*Float Switch*

When, during any cycle, the solvent level in reservoir 50 reaches a selected maximum depth (for example, 17″) the float switch FS (branch bb) closes to the high (H) position (shown in FIG. 10) and relay 7CR is energized. Contacts 7CR–2 (branch hh) then move to the energized (open) position, and the transfer pump motor relay 3M–R is deenergized, thus shutting down the transfer pump motor 3M and the transfer pump TP (FIGS. 7, 8, 9). Contacts 7CR–1 (branch cc) move to the deenergized position and the transfer valve operator VO–3 moves its contacts VO–3–1 to the upper position and changes valve 110 in the transfer pump discharge line (FIG. 8) to the closed position.

When the solvent level drops to say 14″, the contacts of float switch FS opens to the low (L) position, and relay 7CR is deenergized. The contacts 7CR–2 close to the energized position and the transfer pump motor relay 3M–R is energized, thus turning on the motor 3M of pump TP. The contacts 8CR–1 and 7CR–1 (branch cc) move to the energized positions and transfer valve operator VO–3 moves to the transfer position. This moves valve 110 (FIG. 8) in the transfer pump discharge line to the open position.

*Pressure Switch*

If, during the filtration cycle, the pressure exceeds the value set on the pressurestat, the contacts of the pressure switch PR (branch gg) close and the relay 6CR is energized through the contacts of the auxiliary switch VO–2–2 of the filter sweep valve operator VO–2. The contacts 6CR–1 (branch n) close and the relay 1CR is energized, thus closing the contacts 1CR–1 (branch p) and energizing timer T1. The contacts 6CR–2 (branch o) also close and relays 2CR and 3CR are energized. This places the unit int he backwash cycle. Contacts 3CR–2 move to the energized position and filter sweep valve operator VO–2 is energized and moves to the sweep position, as previously described in connection with the backwash cycle. Pump switch PS (branch x) is now closed, and the backwash cycle takes place under the control of timer T1.

*Selective Backwash*

If, at any time, a backwash cycle is desired, even though not called for by pressurestat 100, the operator merely pushes the restart-backwash button and the unit will recycle in the manner described under the backwash cycle.

*Stop*

To stop operation of the automatic filtration system, the operator pushes the stop button (branch j). This opens the contacts of stop switch SS and relay 8CR is deenergized. The contacts 8CR–2 (branch k) move to deenergized position and line L(3) is deenergized, but through the contacts of 8CR–2 in deenergized position transfer valve operator VO–3 operates to change valve 110 in the transfer pump discharge line from open to closed position.

Centrifuge

Whenever the operator desires to centrifuge the secondary filter 79, he closes the centrifuge switch CS (branch *aa*). This energizes the centrifuge motor relay 2M–R and turns on the motor 2M. To stop the spinning of the basket of secondary filter 79, the centrifuge switch CS is opened. This deenergizes the centrifuge motor 2M. Note that motor 2M is not controlled by the stop switch SS (branch *j*) and that the secondary filter 79 may be centrifuged at any time even though the filtration system is otherwise shut down.

Miscellaneous

As shown in FIG. 10, the motor 1M, 2M and 3M are supplied, through the starting-motor relay switch contacts and the overload switches OL, from the 220-volt, 60-cycle, three-phase power lines LL–1, LL–2 and LL–3. The control circuits are supplied from the 110-volt, 60-cycle, single-phase power lines LL–1 and LL–2 through the transformer T, the fuses F1 and F2, and the overload relay contacts OL–1 and OL–2 and OL–3.

It may also be mentioned that included in branch *v* of FIG. 10 is a lamp VL for illuminating the visual flow device V shown in piping 85 in FIGS. 7, 8, and 9.

While the automatic filtration system of the present invention is, of course, not limited thereto, a system which has been reduced to commercial practice employs a backwash timer T-1 and a precoat timer T2 each set at 1½ minutes, a clear-up timer T3 set at 1 minute, and a pressure switch 100 set at about 30 p.s.i.g. which is about 10 p.s.i.g. above the pressure normally read by the gauge G (FIGS. 7, 8 and 9) in the discharge line 81 of the circulating pump CP. The secondary filter or centrifuge extractor 79 is designed to receive the soiled filter powder from about 25 backwash cycles, before requiring emptying. Before emptying, the basket of the centrifuge extractor 79 is centrifuged for about 25 minutes. The filter powder dispenser 51 is designed to hold approximately 25 quarts of filter powder which is sufficient for about 25 precoats and additional intermittent body feeding during the intervening filtration cycles.

While the preferred embodiment of this invention has been described in some detail, it will be obvious to one skilled in the art that various modifications may be made without departing from the invention as hereinafter claimed.

It is also to be understood that while the automatic filtration system of the present invention has been specifically described as a filter for a vapor solvent degreaser, the use of the new filtration system is much broader, and includes the filtration and purification of a large number of industrial liquids.

Having described our invention, we claim:

1. In a filtering apparatus for removing solid soils from a liquid, said apparatus comprising: a reservoir for said liquid; a main filter; a secondary filter of the rotatable centrifuge type adapted to function as a sub-filter and muck storage container; an automatic filter powder dispenser mounted on said reservoir and having a rotatable feed mechanism adapted to dispense into said reservoir a uniform quantity of dry filter powder for each rotation of said feed mechanism; conduit means interconnecting said main filter, reservoir and secondary filter; valve means for controlling the direction of flow through said conduit means; electrically responsive valve operator means, including valve operator switch means; a pump for flowing said liquid under pressure through said conduit means, main filter, reservoir and secondary filter; pressure sensitive switch means in the conduit means connecting said reservoir to said main filter and adapted to be actuated when the flow pressure rises above a selected value; relay control means connected electrically to said pressure-sensitive switch means and to said valve operator means and actuable in response to actuation of said pressure sensitive switch for opening and closing valve means to effect reversal of flow of liquid through said main filter, to accomplish backwashing thereof; first timer means for controlling the duration of the backwash cycle; second timer means actuable by said first timer means at the termination of the backwash cycle for de-energizing said pump, for actuating valve operator means to return said valve means to filter positions, for actuating said rotatable feed mechanism of said filter powder dispenser to dispense filter powder into said reservoir for the precoat cycle, and for controlling the duration of the precoat cycle; and third timer means actuable by said second timer means at the termination of the precoat cycle for energizing said pump, for de-energizing said feed mechanism of the filter powder dispenser, and for actuating valve operator means to change said valve means to the filter cycle.

2. Apparatus as claimed in claim 1 still further characterized by the provision of manually connectable fourth timer means having cam means for controlling the intermittent energizing of said rotatable feed mechanism of said filter powder dispenser, thereby to feed filter powder intermittently during the filter cycle.

3. Apparatus as claimed in claim 2 still further characterized by the provision of manual control means for rotating said secondary filter at desired times independently of the operating condition of the remainder of the apparatus.

References Cited in the file of this patent

UNITED STATES PATENTS

| | | |
|---|---|---|
| 598,296 | Synder et al. | Feb. 1, 1898 |
| 2,149,252 | Cleveland | Mar. 7, 1939 |
| 2,451,073 | Cowherd | Oct. 12, 1948 |
| 2,455,130 | Lomax | Nov. 30, 1948 |
| 2,828,862 | Johnson | Apr. 1, 1958 |
| 2,895,883 | Hobson | July 21, 1959 |
| 2,971,648 | Lane et al. | Feb. 14, 1961 |
| 3,100,191 | Smith et al. | Aug. 6, 1963 |